United States Patent [19]
Andersson et al.

[11] Patent Number: 5,180,147
[45] Date of Patent: Jan. 19, 1993

[54] VIBRATION DAMPER

[75] Inventors: Joachim Andersson, Anderstorp; Bengt-Göran Gustafsson, Bredaryd, both of Sweden

[73] Assignee: Forsheda AB, Sweden

[21] Appl. No.: 651,406

[22] PCT Filed: Jul. 11, 1990

[86] PCT No.: PCT/EP90/00488
§ 371 Date: Feb. 26, 1991
§ 102(e) Date: Feb. 26, 1991

[87] PCT Pub. No.: WO91/00967
PCT Pub. Date: Jan. 24, 1991

[30] Foreign Application Priority Data
Jul. 11, 1989 [SE] Sweden .................................. 8902502

[51] Int. Cl.$^5$ .................................. F16F 7/00
[52] U.S. Cl. .................................. 267/136; 188/379
[58] Field of Search .................... 188/378, 379, 380; 248/559, 632, 634, 636, 638; 267/136, 137, 138, 139, 140; 74/574

[56] References Cited
U.S. PATENT DOCUMENTS

| | | | |
|---|---|---|---|
| 989,958 | 4/1911 | Frahm | 188/380 |
| 2,797,931 | 7/1957 | Hans | 188/380 |
| 3,432,127 | 5/1967 | Philipp | 248/634 |
| 3,436,042 | 4/1969 | Van Goubergen | 248/636 |
| 3,972,119 | 8/1976 | Bailey | 267/137 |
| 5,024,425 | 6/1991 | Schwerdt | 248/636 |

FOREIGN PATENT DOCUMENTS

| | | |
|---|---|---|
| 2143772 | 3/1972 | Fed. Rep. of Germany ...... 188/379 |
| 2139192 | 2/1973 | Fed. Rep. of Germany . |
| 2807160 | 8/1979 | Fed. Rep. of Germany . |
| 3415571 | 10/1984 | Fed. Rep. of Germany . |
| 1004768 | 4/1952 | France . |
| 1050638 | 1/1954 | France . |
| 201928 | 2/1966 | Sweden . |
| 2165918 | 4/1986 | United Kingdom . |

Primary Examiner—Robert J. Oberleitner
Assistant Examiner—Chris Schwartz
Attorney, Agent, or Firm—Lerner, David, Littenberg, Krumholz & Mentlik

[57] ABSTRACT

Vibration damper for damping vibrations in a surface (20) of an object (21). The damper consists of an oscillating body (1) which is movably connected to the surface such that it is brought to oscillate so that the oscillating body transmits forces to the object which are principally oppositely directed to the forces which, through vibration, act on the object. The vibration damper displays a locating part (19) made from a shaped permanent material and intended to be fixedly attached to said surface (20) of the object (21). The locating part displays one or several inwardly-directed vibration-transmitting support walls (26-29). The oscillating body (1) is at least partially enclosed in a damping body (10) made from an elastic material, and the damping body is held in the locating part through cooperation with the inwardly directed walls (26-29).

16 Claims, 3 Drawing Sheets

VIBRATION DAMPER

TECHNICAL FIELD

The present invention relates to a vibration damper for damping vibrations in a surface of an object, which damper comprises at least one oscillating body which is movably connected to said surface such that it is brought to oscillate so that the oscillating body transmits forces to the object which are principally oppositely directed to the forces which, through vibration, act on the object.

BACKGROUND

For damping vibration in a surface of an object, it has been previously known to employ a principle according to which a relatively heavy body is resiliently supported such that the body is brought to oscillate due to the object's vibrations, whereby the body and its support are so adapted in relation to the vibrations' parameters, that the body is brought to oscillate principally in opposition and thereby generates force components which are oppositely directed to the force components which produce the vibrations. Up until now, however, no satisfactory technical device has emerged which can be manufactured to achieve desired damping properties.

The object of the present invention is to provide a simple and effectively functioning device with easily adaptable damping properties and a long life span.

SOLUTION

Said object is achieved by means of a vibration damper which is characterized in that the vibration damper presents a locating part made from a shape-permanent material and intended to be fixedly attached to said surface of the object, that the locating part displays one or several inwardly facing vibration-transmitting support walls, that the oscillating body is supported at a distance from the support walls via damping elements of an elastic material, and that said damping elements are held in position in the locating part through cooperation with said inwardly facing wall or walls.

BRIEF DESCRIPTION OF THE DRAWINGS

The invention will be more closely described in the following with several embodiments and with reference to the attached drawings in which.

PREFERRED EMBODIMENTS

Figure 1:
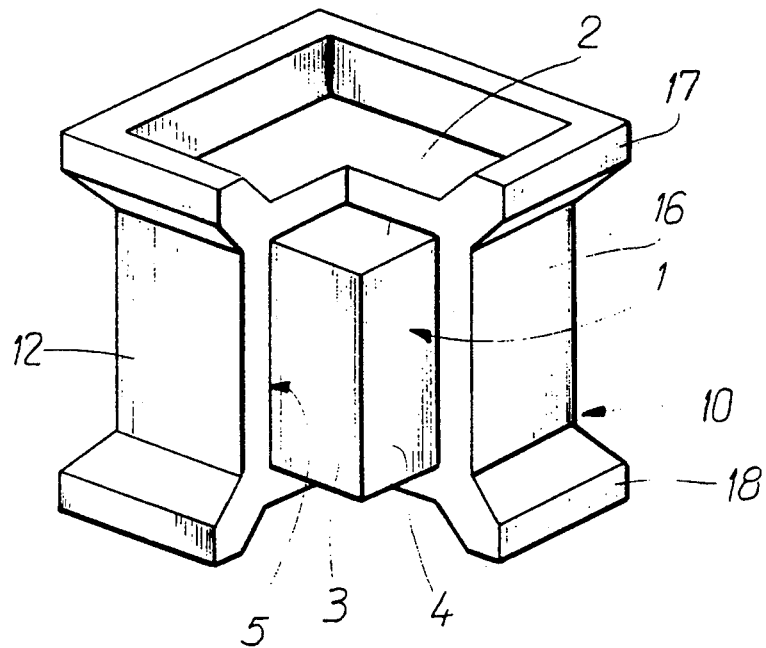
FIG. 1 shows in a partly sectioned perspective view a part of the vibration damper according to the invention.
Figure 2:
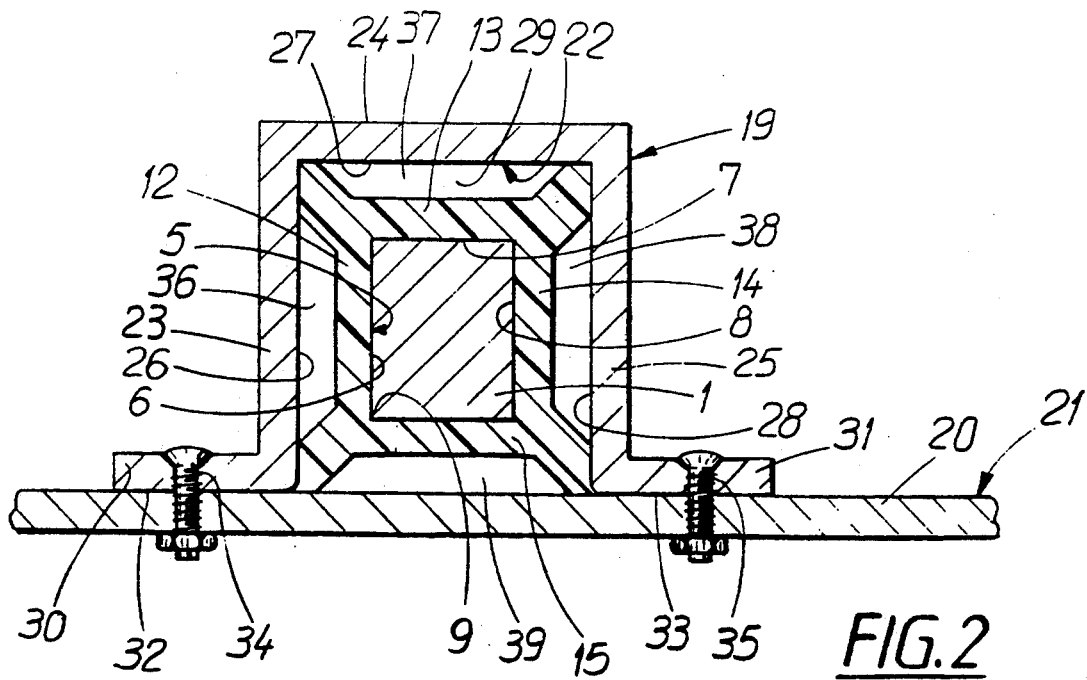
FIG. 2 shows a cross-section through a complete vibration damper according to the first embodiment shown in FIG. 1, FIGS. 3 and 4 show the vibration damper in a second and a third embodiment.

As is evident from the embodiment according to FIGS. 1 and 2, the vibration damper is formed with an oscillating body 1 made from a material of high specific weight, such as steel, copper, tungsten or similar. In the shown example, the oscillating body 1 is formed as a parallelepiped, i.e. with six plane surfaces 2, 3, 4, at right angles to each other. The oscillating body is located in a cavity 5 adapted to the shape of the oscillating body, with a plurality of support surfaces 6, 7, 8, 9 inwardly directed towards the oscillating body 1. As illustrated in FIGS. 1 and 2, six support surfaces are included in this embodiment. The cavity is formed in a damping body 10 which is made from an elastic, suitably highly elastic material, for example rubber, such as natural rubber or synthetic rubber or silicon rubber. The damping body is formed as a housing for the oscillating body 1, in which the latter is suitably moulded. The damping body accordingly completely envelops the oscillating body 1 in the shown example, though in FIG. 1 this is partially sectioned in order to show the location of the oscillating body in the damping body. In the shown example this has enclosing wall parts 12, 13, 14, 15, 16, one wall part for each side surface 6, 7, 8, 9 of the oscillating body. Outwardly projecting spacing elements from the damping body's wall parts, which in the example shown in FIGS. 1 and 2 are made as circumferentially extending inclined flanges 17, 18, more accurately, an upper and a lower flange, which extend all the way around the damping body's two opposed wall parts 13, 15.

The vibration damper further comprises a locating part 19 which is shown in FIG. 2. The locating part 19 is adapted to be held against a surface 20 of the object 21 whose vibrations are to damped with the vibration damper according to the invention. In its mounted state, together with the surface 20 of the object 21, the locating part 19 is adapted to enclose the damping body 10 and thus the oscillating body 1 such that these parts cannot work loose and be thrown off due to the forces of the vibrations. The damping body 10 and thus also the oscillating body 1 are, more accurately, enclosed by the locating part 19 in a cavity 22 in the locating part. In the shown example this is made in a cup-shaped form with a main shape of a parallelepiped or cube having five plane wall parts 23, 24, 25, each of which presents a rectangular or square support surface 26, 27, 28, 29 facing the cavity 22, whilst the sixth side of the parallelepiped or cube is missing and is substituted by a region of the surface 20 which is to be damped. The locating part 19 is provided with flanges 30, 31 which can be two in number and directed away from each other or extend outwardly from each of the vertical wall parts of the locating part shown in the drawing. The flanges 30, 31 form locating flanges with support surfaces 32, 33 to lie against the surface 20 which is to be damped. The locating flanges 30, 31 are provided with screw-holes 34, 35 for fixing means for attachment to the surface 20. In the shown example the fixing means are screws which are guided through holes in a wall section of the object 21 whose vibrations are to be damped. Alternatively, attachment can be achieved through riveting or welding, gluing or similar. What is important is that the attachment is rigid so that the vibrations are transmitted from the object to the locating part 19 so that its inwardly facing support surfaces 26-29 vibrate together with the object. These support surfaces form namely support surfaces for the damping body 10, more accurately its spacing elements 17, 18 which in the shown example are diagonally directed towards the cavity's horizontal upper edge part and corresponding lower edge part respectively. As is evident from the figures, the flanges are bevelled, the purpose of which being to maintain good surface contact with the cavity's inwardly facing support surfaces.

By means of the spacing elements 17, 18, the wall parts 12, 13, 14, 15 surrounding the oscillating body 10 are maintained at a distance from the inwardly facing support surfaces of the cavity 22 of the locating part 19, whereby interstices 36, 37, 38, 39 are accordingly formed between the wall parts and the inwardly facing support surfaces which facilitate movement of the damping body and thereby also of the oscillating body 1 even if the cavity 22 were to be totally filled with damping material. The spacing elements 17, 18 place the damping body symmetrically in the cavity 22 of the locating part 19 since the spacing elements are advantageously the same size and accordingly create equally large interstices between the inwardly facing support surfaces of the cavity and the wall parts of the damping body. Advantageously the damping body as well as the oscillating body can be symmetric with respect to an imaginary vertical symmetrical line in the drawing as well as to a symmetrical horizontal line through the damping body. Although not shown in FIG. 2, the oscillating body 1 as well as the damping body can be substantially cubic.

Figure 3:
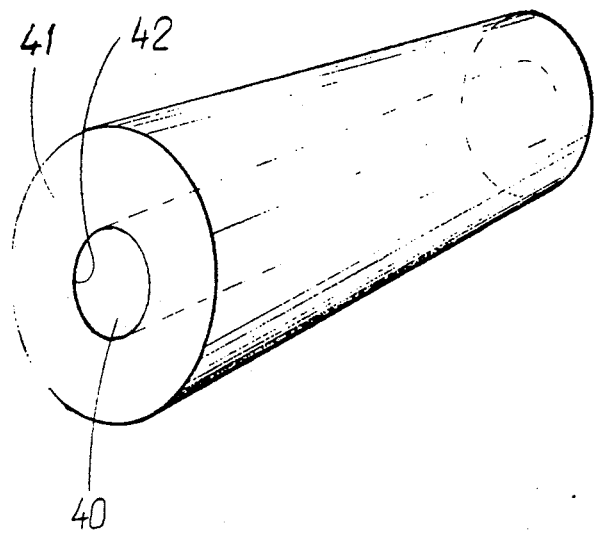

In FIG. 3 there is shown an example of a second embodiment of the active parts of the vibration damper, i.e. the oscillating body and the damping body which are denoted by 40 and 41 respectively. The locating part is not shown but can in principal be formed as an omega, i.e. with a contour adapted to the damping body's shape and with one or two attachment flanges. It is also imaginable that the locating part has an angular cross section, similar to that in FIG. 2 so that line contact between the attachment part's inwardly facing surfaces and the damping body is created in order to give airspace on the side of the contact regions. As can be seen from the drawing, in this example the oscillating body 40 is cylindrical and placed in a hollow cylinder 42 in the damping body 41 which similarly is cylindrical. Other shapes are of course also imaginable, such as a vibration damper with an elliptical cross section. The embodiment shown in FIG. 3 can for example be used for vibration situations where the vibrations produce force components which are principally parallel with a plane, preferably a plane radial to the vibration damper's longitudinal axis. It is also feasible that vibration damping can occur in an axial direction, whereby care has to be taken that the oscillating body's 40 ends do not come into contact with support surfaces of the locating arrangement. This is achieved by for example, the oscillating body 40 having both its ends terminate a short way before the end surfaces of the damping body or, alternatively, by the locating arrangements not having support surfaces directed towards the cylinder's end surfaces.

Figure 4:
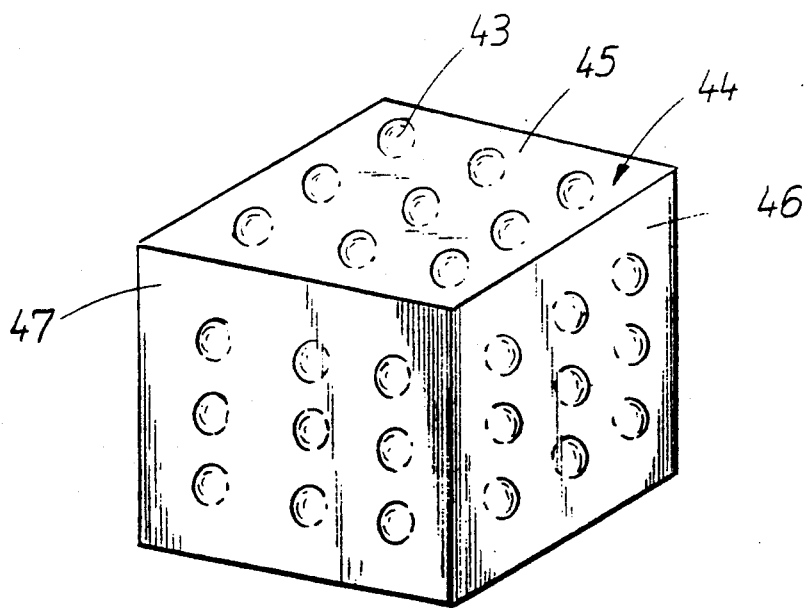

FIG. 4 shows a variation of the vibration damper shown in FIG. 1 and 2, whereby the locating part can be of the same design as that in FIG. 2, but in which the spacing elements are instead formed from a plurality of local spacing elements which are designated by 43. These are provided in the shown example by blister-like projections which are evenly distributed over the damping body's 44 side surfaces and are intended to contact with point or a small surface contact the inwardly facing support surfaces of the locating part. In this way the side surfaces 45, 46, 47 of the damping body 44 are brought to be normally located with interstices at the inwardly facing support surfaces of the locating means.

Figure 5:
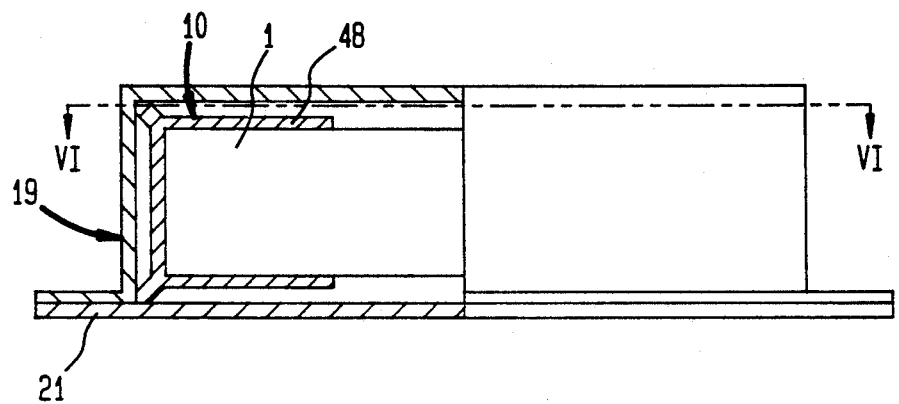
FIGS. 5 and 6 show a fourth embodiment of the vibration damper in partly sectioned views.
Figure 6:
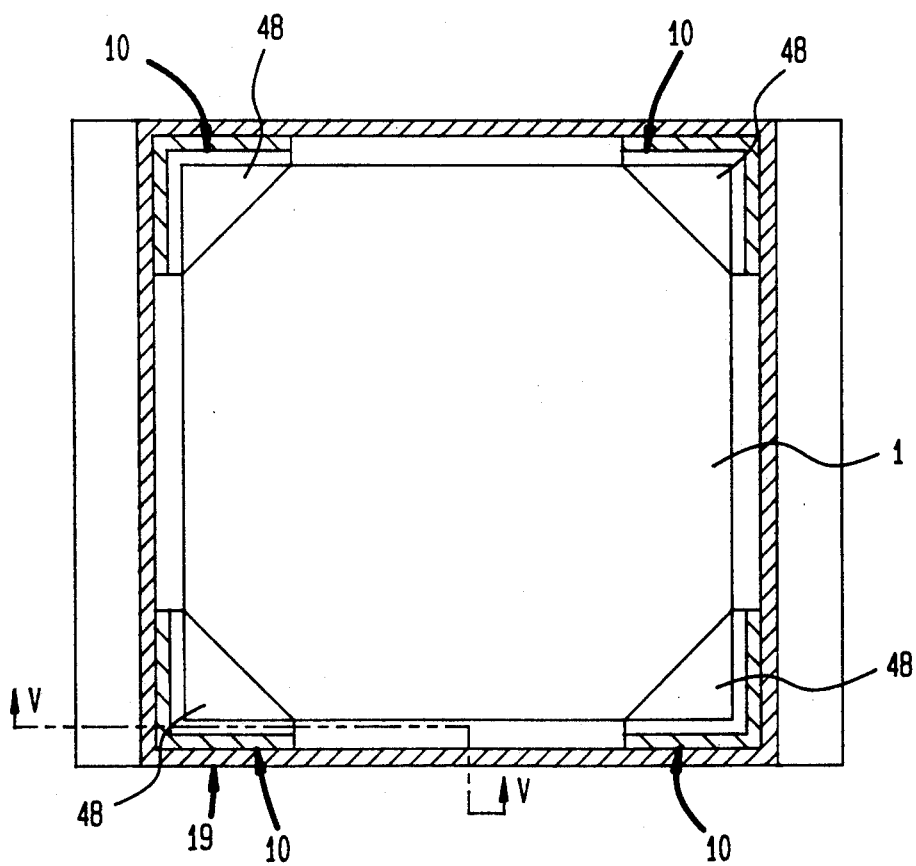

FIGS. 5 and 6 show a further variation of the vibration damper. This has similar principal constructional features to the first embodiment according to FIG. 1 and 2. The locating part 21 can remain unchanged, as can the oscillating body 1 which comprises a plurality of corners, however the plurality of damping elements 10 comprise corner pieces 48 which encircle the plurality of corners of the oscillating body 1.

In the vibration damper according to the invention a heavy body, i.e. the oscillating body, is accordingly elastically supported in a damping body which is positioned in a locating part so that the oscillating body and the damping body are permitted certain movability within a restricted region. The movement of the oscillating body and the damping body is dependent on the vibrations which the object to which the vibration damper is attached is subjected to. Due to the shape permanence and the relative rigidity of the locating arrangement 19, said locating arrangement is brought to chiefly vibrate with the object, whereby the oscillating body, via the damping body, is similarly brought to perform an oscillating movement. Optimal vibration damping is achieved by a suitably balanced spring constant of the damping body, depending on the shape of, particularly, the spacing elements 17, 18 and the choice of material for the damping body, and also by the well chosen mass of the oscillating body, which parameters are suitably chosen depending on the parameters of the vibrations to which the surface 20 of the object is subjected, i.e. the frequencies, amplitudes, directions of movement. Due to the inertia of mass of the oscillating body 1 and the elastic properties of the damping body, the oscillating body will not in fact oscillate in phase with the vibration oscillations in the object 21, but through well balanced parameters for the damping body and the oscillating body, it is assured that the oscillating body is brought to oscillate principally in opposition and thereby counteract the vibrational forces influencing the object 21, whereby these vibrations are dampened. Thanks to the movement of the vibration damper in three dimensions, vibrations in all imaginable directions are dampened since, due to its inertia of mass, the oscillating body is brought to oscillate with a phase shift in the same force directions as the vibrations, though in opposition.

The invention is not restricted to that which is described above and to the embodiments shown in the drawings, but can be varied in a number of ways within the scope of the appended claims. For example, the spacing elements may be formed as a plurality of parallel, longitudinally extending ribs on surfaces of the damping element facing the locating part. The blisters shown in FIG. 4 can be of many different shapes, such as cylindrical, pyrimid-like or cube-like projections. The vibrating body and the damping body can be totally spherical, shaped as a pyramid or cone. Alternatively, the damper can be formed as a sandwich construction with a plurality of damping layers with intermediate metal plates which form oscillating bodies. Hereby the metal plates are for example perforated so that the connection between the damping bodies and the oscillating bodies is assured.

The locating part can for example be provided with ventilation holes in order to avoid problems with vacuum in the interstices. The locating part can also be provided with cooling fins for drawing off the heat energy which is formed in the damping body due to its continuous deformation. The cavity in the locating part can be selected to be smaller than that in the shown example and, as such, a precompression and pre-tension of the damping parts is achieved, by which the frequency and amplitude in the various directions can be given suitable quantities in relation to corresponding parameters of the object's vibrations. The size of the cavity in the damper can be varied for example by the insertion of baseplates which project into the cavity in the housing to various depths. Alternatively, the damping body can be provided with exchangeable spacing elements which can be chosen from a selection with various sizes.

The corner pieces 48 according to FIGS. 5 and 6 can be elongated so that they reach each other and thereby present a divided version of FIGS. 1 and 2. The oscillating body can be spherical or can have totally different shapes and be enclosed in a housing which has the shape according to FIG. 2. Various other alternatives to FIGS. 1 and 2 are imaginable, for example tetrahedron-shaped housing, etc.

We claim:

1. A vibration damper assembly for attachment to a surface of an object to dampen vibrations in said surface comprising locating means forming a casing with an opening and an internal cavity defined by a plurality of inwardly defacing vibration-transmitting support walls whereby when said locating means is attached to said surface, said cavity is enclosed within said plurality of inwardly facing support walls and said surface, said locating means comprising a rigid material, an oscillating body moveably mounted within said cavity, and a damping element comprising a unitary structure and having an elastic material and at least partially enclosing said oscillating body, said damping element including spacing means projecting from said damping element towards corner regions of said cavity formed by said inwardly facing support walls thereby forming interstices between said damping element and said inwardly facing support walls, said spacing means comprising said elastic material.

2. The vibration damper assembly of claim 1 wherein said opening in said locating means is of sufficient size to permit said oscillating body and said damping element to be inserted into said cavity before said locating means is attached to said surface.

3. The vibration damper assembly of claim 1 wherein said oscillating body is molded into said damping element and thereby occupies a cavity within said at least one damping element.

4. The vibration damper assembly of claim 3 wherein both said cavity in said locating means and said cavity within said damping element substantially have the shape of a parallelopiped.

5. The vibration damper assembly of claim 4 wherein said spacing means comprise circumferentially extending flanges.

6. The vibration damper assembly of claim 1 wherein said vibration damper assembly further comprises means for releasably attaching said vibration damper assembly to said surface of said object.

7. A vibration damper assembly for attachment to a surface of an object to dampen vibrations in said surface comprising locating means forming a casing with an opening and an internal cavity defined by a plurality of inwardly facing vibration-transmitting support walls whereby when said locating means is attached to said surface, said cavity is enclosed within said plurality of inwardly facing support walls and said surface, said locating means comprising a rigid material, an oscillating body moveably mounted within said cavity, and a plurality of damping elements comprising an elastic material, said plurality of damping elements at least partially enclosing said oscillating body and not being partially enclosed within said oscillating body, said plurality of damping elements including spacing means projecting from said plurality of at damping elements towards corner regions of said cavity formed by said inwardly facing support walls thereby forming interstices between said damping elements and said inwardly facing support walls, said spacing means comprising said elastic material.

8. The vibration damper assembly of claim 7 wherein said oscillating body comprises a plurality of corners, and wherein said plurality of damping elements comprise corner pieces encircling said plurality of corners of said oscillating body.

9. The vibration damper assembly of claim 7 wherein said vibration damper assembly further comprises means for releasably attaching said vibration damper assembly to said surface of said object.

10. The vibration damper assembly of claim 9 wherein said means for releasably attaching said vibration damper assembly to said surface of said object comprises screw means for selectively attaching and detaching said vibration damper assembly with respect to said surface.

11. A vibration damper assembly for attachment to a surface of an object to dampen vibrations in said surface comprising locating means forming a casing with an opening and an internal cavity defined by a plurality of inwardly facing vibration-transmitting support walls whereby when said locating means is attached to said surface, said cavity is enclosed within said plurality of inwardly facing support walls and said surface, said locating means comprising a rigid material, an oscillating body movably mounted within said cavity, and at least one damping element comprising an elastic material entirely enclosing said oscillating body, said at least one damping element including spacing means projecting from said at least one damping element towards corner regions of said cavity formed by said inwardly facing support walls thereby forming interstices between said damping element and said inwardly facing support walls, said spacing means comprising said elastic material.

12. The vibration damper assembly of claim 11 wherein said opening in said locating means is of sufficient size to permit said oscillating body and said at least one damping element to be inserted into said cavity before said locating means is attached to said surface.

13. The vibration damper assembly of claim 11 wherein said oscillating body is molded into said at least one damping element and thereby occupies a cavity within said at least one damping element.

14. The vibration damper assembly of claim 13 wherein both said cavity in said locating means and said cavity within said at least one damping element substantially have the shape of a parallelepiped.

15. The vibration damper assembly of claim 14 wherein said spacing means comprises circumferentially extending flanges.

16. The vibration damper assembly of claim 11 wherein said vibration damper assembly further comprises means for releasably attaching said vibration damper assembly to said surface of said object.

* * * * *

UNITED STATES PATENT AND TRADEMARK OFFICE
CERTIFICATE OF CORRECTION

PATENT NO.  : 5,180,147

DATED      : January 19, 1993

INVENTOR(S) : Andersson et al.

It is certified that error appears in the above-identified patent and that said Letters Patent is hereby corrected as shown below:

```
On the title page, PCT No.:    "PCT/EP90/00488" should read
--PCT/SE90/00488--.
Column 1, line 66, between "body" and "is", insert --1--.
Column 1, line 67, after "body", delete "," and insert --1--.".
Column 6, line 6, delete "at".
Column 1, line 65, after "4" delete --,--.
```

Signed and Sealed this

Fourth Day of January, 1994

Attest:

BRUCE LEHMAN

Attesting Officer

Commissioner of Patents and Trademarks